United States Patent [19]

Lomas et al.

[11] 4,353,812

[45] Oct. 12, 1982

[54] FLUID CATALYST REGENERATION PROCESS

[75] Inventors: David A. Lomas, Arlington Heights; Gregory J. Thompson, Waukegan, both of Ill.

[73] Assignee: UOP Inc., Des Plaines, Ill.

[21] Appl. No.: 273,296

[22] Filed: Jun. 15, 1980

[51] Int. Cl.[3] .................... B01J 21/20; C10G 11/18; F27B 15/08; B01J 29/38

[52] U.S. Cl. .................... 252/417; 165/104.16; 208/164; 252/419; 422/144

[58] Field of Search ............... 252/417, 419; 208/164; 165/104.16

[56] References Cited

U.S. PATENT DOCUMENTS

| | | | |
|---|---|---|---|
| 2,463,623 | 3/1949 | Huff | 23/288 |
| 2,492,948 | 1/1950 | Berger | 252/417 |
| 2,506,123 | 5/1950 | Watson | 23/288 |
| 2,515,156 | 7/1950 | Jahnig et al. | 23/288 |
| 2,518,693 | 8/1950 | Jahnig | 252/417 |
| 2,596,748 | 5/1952 | Watson et al. | 252/417 |
| 2,684,931 | 7/1954 | Berg | 422/144 |
| 2,735,744 | 2/1956 | Rex | 252/417 |
| 2,819,951 | 1/1958 | Medlin et al. | 23/288 |
| 2,862,798 | 12/1958 | McKinney | 23/288 |
| 2,873,175 | 2/1959 | Owens | 23/288 |
| 2,970,117 | 1/1961 | Harper | 252/417 |
| 3,990,992 | 11/1976 | McKinney | 252/417 |
| 4,009,121 | 2/1977 | Luckenbach | 252/417 |
| 4,219,442 | 8/1980 | Vickers | 252/417 |

OTHER PUBLICATIONS

A.I.Ch.E. Journal, Dec. 1956, vol. 2, No. 4, pp. 482-488, "Fluidized-Bed Heat Transfer: A Generalized Dense-Phase Correlation", Wen et al.

*Primary Examiner*—P. E. Konopka
*Attorney, Agent, or Firm*—James R. Hoatson, Jr.; Louis A. Morris; William H. Page, II

[57] ABSTRACT

A catalyst regeneration process and apparatus for the oxidative removal of coke from a coke contaminated fluid catalyst. The process comprises a high temperature coke combustion zone, a catalyst disengagement zone and an external heat removal zone comprising a shell and tube heat exchanger. Catalyst is cooled by passing it through the shell side of the heat exchanger with a cooling medium through the tube side. A mixture of coke contaminated catalyst, oxygen containing gas, and cool regenerated catalyst from the heat removal zone are contacted in the high temperature combustion zone, the temperature of which is controlled by adjusting the rate at which fluidizing gas is passed to the bottom portion of the shell of the heat exchanger which varies the degree of turbulence of the fluidized bed in the shell side and thus the heat transfer coefficient at the outside surface of the tubes which in turn varies the quantity of heat transferred to the cooling medium in the tubes.

7 Claims, 2 Drawing Figures

FLUID CATALYST REGENERATION PROCESS

BACKGROUND OF THE INVENTION

The field of art to which this invention pertains is fluid catalyst regeneration. It relates to the rejuvenation of particulated solid, fluidizable catalyst which has been contaminated by the deposition thereupon of coke. The present invention will be most useful in a process for regenerating coke-contaminated fluid cracking catalyst, but it should find use in any process in which coke is burned from a solid, particulated, fluidizable catalyst.

DESCRIPTION OF THE PRIOR ART

The fluid catalytic cracking process (hereinafter FCC) has been extensively relied upon for the conversion of starting materials, such as vacuum gas oils, and other relatively heavy oils, into lighter and more valuable products. FCC involves the contact in a reaction zone of the starting material, whether it be vacuum gas oil or another oil, with a finely divided, or particulated, solid, catalytic material which behaves as a fluid when mixed with a gas or vapor. This material possesses the ability to catalyze the cracking reaction, and in so acting it is surface-deposited, with coke, a by-product of the cracking reaction. Coke is comprised of hydrogen, carbon and other material such as sulfur, and it interferes with the catalytic activity of FCC catalysts. Facilities for the removal of coke from FCC catalyst, so-called regeneration facilities or regenerators, are ordinarily provided within an FCC unit. Regenerators contact the coke-contaminated catalyst with an oxygen containing gas at conditions such that the coke is oxidized and a considerable amount of heat is released. A portion of this heat escapes the regenerator with flue gas, comprised of exess regeneration gas and the gaseous products of coke oxidation, and the balance of the heat leaves the regenerator with the regenerated, or relatively coke free, catalyst. Regenerators operating at superatmospheric pressures are often fitted with energy-recovery turbines which expand the flue gas as it excapes from the regenerator and recover a portion of the energy liberated in the expansion.

The fluidized catalyst is continuously circulated from the reaction zone to the regeneration zone and then again to the reaction zone. The fluid catalyst, as well as providing catalytic action, acts as a vehicle for the transfer of heat from zone to zone. Catalyst exiting the reaction zone is spoken of as being "spent", that is partially deactivated by the deposition of coke upon the catalyst. Catalyst from which coke has been substantially removed is spoken of as "regenerated catalyst".

The rate of conversion of the feedstock within the reaction zone is controlled by regulation of the temperature, activity of catalyst and quantity of catalyst (i.e. catalyst to oil ratio) therein. The most common method of regulating the temperature is by regulating the rate of circulation of catalyst from the regeneration zone to the reaction zone which simultaneously increases the catalyst/oil ratio. That is to say, if it is desired to increase the conversion rate an increase in the rate of flow of circulating fluid catalyst from the regenerator to the reactor is effected. Inasmuch as the temperature within the regeneration zone under normal operations is invariably higher than the temperature within the reaction zone, this increase in influx of catalyst from the hotter regeneration zone to the cooler reaction zone effects an increase in reaction zone temperature. It is interesting to note that: this higher catalyst circulation rate is sustainable by virtue of the system being a closed circuit; and, the higher reactor temperature is sustainable by virtue of the fact that increased reactor temperatures, once effected, produce an increase in the amount of coke being formed in the reaction and deposited upon the catalyst. This increased production of coke, which coke is deposited upon the fluid catalyst within the reactor, provides, upon its oxidation within the regenerator, an increased evolution of heat. It is this increased heat evolved within the regeneration zone which, when conducted with the catalyst to the reaction zone, sustains the higher reactor temperature operation.

Recently, politico-economic restraints which have been put upon the traditional lines of supply of crude oil have made necessary the use, as starting materials in FCC units, of heavier-than-normal oils. FCC units must now cope with feedstocks such as residual oils and in the future may require the use of mixtures of heavy oils with coal or shale derived feeds.

The chemical nature and molecular structure of the feed to the FCC unit will affect that level of coke on spent catalyst. Generally speaking, the higher the molecular weight, the higher the Conradson carbon, the higher the heptane insolubles, and the higher the carbon to hydrogen ratio, the higher will be the coke level on the spent catalyst. Also high levels of combined nitrogen, such as found in shale derived oils, will also increase the coke level on spent catalyst. The processing of heavier and heavier feedstocks, and particularly the processing of deasphalted oils, or direct processing of atmospheric bottoms from a crude unit, commonly referred to as reduced crude, does cause an increase in all or some of these factors and does therefore cause an increase in coke level on spent catalyst.

This increase in coke on spent catalyst results in a larger amount of coke burnt in the regenerator per pound of catalyst circulated. Heat is removed from the regenerator in conventional FCC units in the flue gas and principally in the hot regenerated catalyst stream. An increase in the level of coke on spent catalyst will increase the temperature difference between the reactor and the regenerator, and in the regenerated catalyst temperature. A reduction in the amount of catalyst circulated is therefore necessary in order to maintain the same reactor temperature. However, this lower catalyst circulation rate required by the higher temperature difference between the reactor and the regenerator will result in a fall in conversion, making it necessary to operate with a higher reactor temperature in order to maintain conversion at the desired level. This will cause a change in yield structure which may or may not be desirable, depending on what products are required from the process. Also there are limitations to the temperatures that can be tolerated by FCC catalyst without there being a substantial detrimental effect on catalyst activity. Generally, with commonly available modern FCC catalyst, temperatures of regenerated catalyst are usually maintained below 1400° F., since loss of activity would be very severe about 1400°–1450° F. If a relatively common reduced crude such as that derived from Light Arabian crude oil were charged to a conventional FCC unit, and operated at a temperature required for high conversion to lighter products, i.e. similar to that for a gas oil charge, the regenerator temperature would operate in the range of 1600°–1800° F. This would be too high a temperature for the catalyst, require very expensive materials of construction, and give an extremely low catalyst circulation rate. It is therefore accepted that when materials are processed that would give excessive regenerator temperatures, a means must be provided for removing heat from the regenerator, which enables a lower regenerator temperature, and a lower temperature difference between the reactor and the regenerator.

A common prior art method of heat removal provides coolant filled coils within the regenerator, which coils are in contact with the catalyst from which coke is being removed. For example, Medlin et al. U.S. Pat. No. 2,819,951, McKinney U.S. Pat. No. 3,990,992 and Vickers U.S. Pat. No. 4,219,442 disclose fluid catalytic cracking processes using dual zone regenerators with cooling coils mounted in the second zone. These cooling coils must always be filled with coolant and thus be removing heat from the regenerator, even during start-up when such removal is particularly undesired, because the typical metallurgy of the coils is such that the coils would be damaged by exposure to the high regenerator temperatures (up to 1350° F.) without coolant serving to keep them relatively cool. The second zone is also for catalyst disengagement prior to passing the flue gas from the system, and may contain catalyst in a dense phase (Medlin et al. and Vickers) or in a dilute phase (McKinney). Coolant flowing through the coils absorbs heat and removes it from the regenerator.

The prior art is also replete with disclosures of FCC processes which utilize dense or dilute phase regenerated fluid catalyst heat removal zones or heat exchangers that are remote from and external to the regenerator vessel to cool hot regenerated catalyst for return to the regenerator. Examples of such disclosures are as set forth in Harper U.S. Pat. No. 2,970,117; Owens U.S. Pat. No. 2,873,175; McKinney U.S. Pat. No. 2,862,798; Watson et al. U.S. Pat. No. 2,596,748; Jahnig et al. U.S. Pat. No. 2,515,156; Berger U.S. Pat. No. 2,492,948; and Watson U.S. Pat. No. 2,506,123. At least one of the above U.S. patents (Harper) discloses that the rate of return of the cooled catalyst to the regenerator may be controlled by the regenerator (dense catalyst phase) temperature.

An important consideration in the above FCC processes involving regenerator heat removal is the method of control of the quantity of heat removed. For example, in Vickers U.S. Pat. No. 4,219,442 the method involves the control of the extent of immersion of cooling coils in a dense phase regenerated catalyst fluidized bed. In Harper U.S. Pat. No. 2,970,117 and Huff U.S. Pat. No. 2,463,623, the methods involve regulation of the rate of flow of regenerated catalyst through external catalyst coolers. The disadvantages of the first above heat removal method have been previously discussed, i.e. interference of the cooling coils with unit start-up and catalyst disengagement. The above second method of heat removal, utilizing external coolers and varying the rate of catalyst circulation through them, involves the continual changing of the catalyst loading on the regenerator with the associated difficulty or impossibility of maintaining convenient steady state operations.

It is known to those skilled in the art of chemical engineering that the heat transfer coefficient of a heat exchange surface varies in relation to the mass velocity across such surface for fluidized systems. See, for example, the article "Fluidized-bed Heat Transfer: A Generalized Dense-phase Correlation"; *A.I.Ch.E. Journal*; December, 1956; Vol. 2, No. 4; ppg. 482–488.

The present invention enables a high degree of flexibility and efficiency of operation of an FCC regenerator by utilization of a regenerated catalyst cooler or heat exchanger, remote from the FCC regenerator, but unlike the above prior art FCC processes, the present invention controls the rate of cooling by the heat exchanger in a manner based upon principles involving the relationship between heat transfer coefficients and mass velocity, and not by varying the flow rate of circulating catalyst.

SUMMARY OF THE INVENTION

Accordingly, the invention is, in one embodiment, a process for regenerating a coke contaminated fluid catalyst, the process including the steps of: (a) introducing oxygen containing regeneration gas, coke contaminated fluid catalyst, and cool recycled regenerated catalyst from a source hereinafter described, into a lower locus of a dilute phase combustion zone maintained at a temperature sufficient for coke oxidation and therein oxidizing coke to produce hot regenerated catalyst and hot flue gas; (b) transporting the hot flue gas and the hot regenerated catalyst from an upper locus of the combustion zone into a regenerated catalyst disengaging zone, wherein the hot regenerated catalyst is separated from the flue gas; (c) transporting a portion of the hot regenerated catalyst from the disengaging zone to the upper locus of a cooling zone separate from the disengaging zone wherein the hot regenerated catalyst is passed downwardly and heat is withdrawn from the hot regenerated catalyst by indirect heat exchange with a cooling fluid enclosed in a heat exchange means inserted into the cooling zone to produce cool regenerated catalyst, the catalyst being maintained in the cooling zone as a dense phase fluidized bed by passing a fluidizing gas upwardly through such bed, the quantity of heat withdrawal from the catalyst in the cooling zone being controllably maintained by controlling the quantity of the fluidizing gas into the cooling zone, whereby the heat transfer coefficient between the heat exchange means and the fluidized bed and thus the quantity of heat transferred is controlled; and (d) withdrawing the cool regenerated catalyst from a lower locus of the cooling zone and transporting the catalyst to the lower locus of the combustion zone as the cool recycled regenerated catalyst.

In a second embodiment, the invention is an apparatus for regenerating a coke contaminated, fluid catalyst which apparatus comprises in combination: (a) a vertically oriented combustion chamber; (b) a disengagement chamber located superadjacent to and above the combustion chamber and in communication therewith; (c) a catalyst collection section at the bottom of the disengagement chamber; (d) a shell and tube heat exchanger of vertical orientation remote from the combustion and disengagement chambers, having a catalyst inlet at an upper portion of the shell side of the heat exchanger and a catalyst outlet at a bottom portion of the shell side of the heat exchanger; (e) a hot catalyst conduit connecting the bottom catalyst collection portion of the disengagement chamber with the heat exchanger inlet, such that hot regenerated catalyst can flow from the disengagement chamber to the heat exchanger; (f) a cooled catalyst conduit connecting the catalyst outlet of the heat exchanger with a lower portion of the combustion chamber, such that cooled catalyst can flow from the heat exchanger to the lower portion of the combustion chamber; (g) a fluidizing gas inlet conduit connected to a bottom portion of the shell side of the heat exchanger, such that fluidizing gas can pass into the shell side and maintain a fluidized catalyst bed therein; (h) a control valve placed in the fluidizing gas inlet conduit, and a control system comprising means to sense the temperature at a selected location in the combustion chamber, temperature control means having an adjustable set point connecting with the temperature sensing means and developing an output signal, and means for transmitting the output signal to the control valve whereby the latter is adjusted responsive to the temperature, thereby regulating the flow of fluidizing gas into the heat exchanger; and (i) inlet and outlet conduits connected to the tubes of the heat exchanger, such that a cooling fluid can flow through the tubes.

Other embodiments of the present invention encompass further details such as process streams and the function and arrangement of various components of the apparatus, all of which are hereinafter disclosed in the following discussion of each of these facets of the invention.

The above described drawings are intended to be schematically illustrative of the present invention and not be limitations thereon.

DETAILED DESCRIPTION OF THE INVENTION

The present invention, in its process aspects, consists of steps for the regenerative combustion within a combustion zone of the coke contaminated catalyst from a reaction zone to form hot flue gas and hot regenerated catalyst, disengagement and collection of the hot regenerated catalyst, cooling of a portion of the hot regenerated catalyst within a heat removal zone, using the cooled regenerated catalyst as a heat sink, and the use of the cooled regenerated catalyst for control of the temperatures of the combustion zone. As used herein, the term "hot regenerated catalyst" means regenerated catalyst at the temperature leaving the combustion zone, from about 1300° F. to about 1400° F., while the term "cool regenerated catalyst" means regenerated catalyst at the temperature leaving the cooling zone, about 200° F. less than the temperature of the hot regenerated catalyst.

Figure 1:
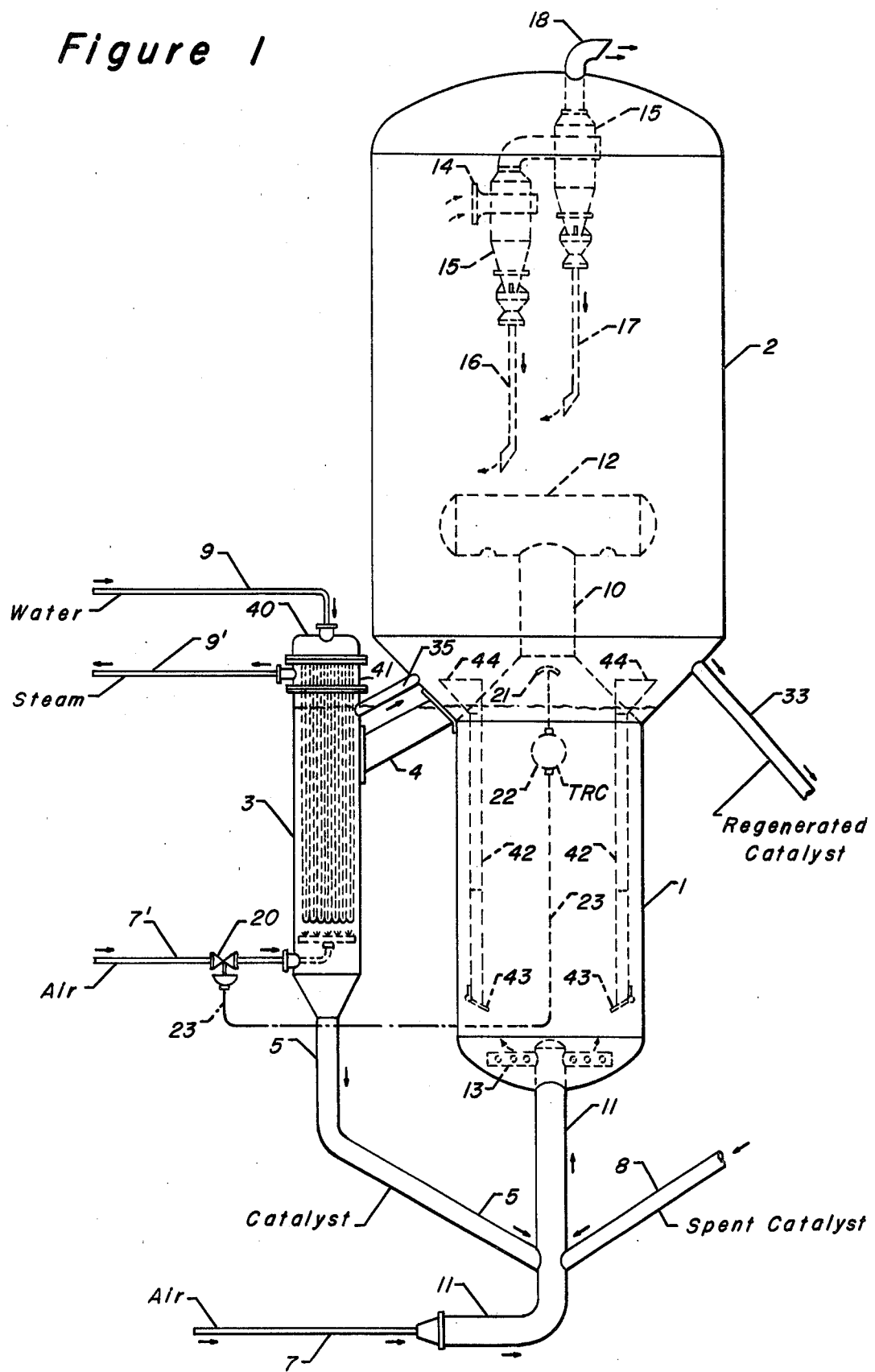
FIG. 1 is a sectional, elevation view of a regeneration apparatus according to the present invention, showing combustion zone 1, disengagement zone 2, cooling zone (heat exchanger) 3, hot catalyst conduit 4, heat exchanger and cooled catalyst discharge conduit 5.

Reference will now be made to the attached drawings for a discussion of the regeneration process and apparatus of the invention. In FIG. 1 regeneration gas, which may be air or another oxygen containing gas, enters in line 7 and mixes with coke contaminated catalyst entering in conduit 8, and cool regenerated catalyst entering in conduit 5. These streams are shown as all flowing together into mixing conduit 11, although each stream could flow individually into combustion zone 1. The resultant mixture of coke contaminated catalyst, regenerated catalyst and regeneration gas are distributed into the interior of combustion zone 1, at a lower locus thereof, via conduit 11 and distributor 13. Coke contaminated catalyst commonly contains from about 0.1 to about 5 wt. % carbon, as coke. Coke is predominantly comprised of carbon, however, it can contain from about 5 to about 15 wt. % hydrogen, as well as sulfur and other materials. The regeneration gas and entrained catalyst flows upward from the lower part of combustion zone 1 to the upper part thereof in dilute phase. The term "dilute phase", as used herein, shall mean a catalyst/gas mixture of less than 30 lbs. per cubic foot, and "dense phase" shall mean such mixture equal to or more than 30 lbs. per cubic foot. Dilute phase conditions, that is a catalyst/gas mixture of less than 30 lbs. per cubic foot, and typically 2–10 lbs. per cubic foot, are the most efficient for coke oxidation. As the catalyst/gas mixture ascends within combustion zone 1 the heat of combustion of coke is liberated and absorbed by the now relatively carbon free catalyst, in other words by the regenerated catalyst.

The rising catalyst/gas stream flows through passageway 10 and impinges upon surface 12, which impingement changes the direction of flow of the stream. It is well known in the art that impingement of a fluidized particulate stream upon a surface, causing the stream to turn through some angle, can result in the separation from the stream of a portion of the solid material therein. The impingement of the catalyst/gas stream upon surface 12 causes almost all of the hot regenerated catalyst flowing from the combustion zone to disengage from the flue gas and fall to the bottom portion of disengagement zone 2. The catalyst collection area of the disengagement zone may be a cone-shaped annular receptacle, as shown, or any other shape appropriate for collecting catalyst particles. The gaseous products of coke oxidation and excess regeneration gas, or flue gas, and the very small uncollected portion of hot regenerated catalyst flow up through disengagement zone 2 and enters separation means 15 through inlet 14.

These separation means may be cyclone separators, as schematically shown in the Figures, or any other effective means for the separation of particulated catalyst from a gas stream. Catalyst separated from the flue gas falls to the bottom of disengagement zone 2 through conduits 16 and 17. The flue gas exits disengagement zone 2 via conduit 18, through which it may proceed to associated energy recovery systems. Having the disengagement zone in upward communication with the combustion zone is advantageous, in comparison to schemes in which the gas/catalyst mixture flows upward into a relatively dense phase heat removal zone, in that, with the former, there is a substantial reduction in the loading of the regenerator cyclones which virtually eliminates large losses of catalyst from FCC units during operational upsets.

With further reference to FIG. 1, in one embodiment of the present invention, a first portion of catalyst collected in the disengaging zone is passed in dense phase, via hot catalyst recycle conduit 4, downwardly into cooling zone 3 which comprises a shell and tube heat exchanger. First catalyst recycle conduit 4 connects to the shell side of heat exchanger 3. Heat exchanger 3 will be of vertical orientation with the catalyst flowing into the shell and the heat exchange medium passing through the tubes via lines 9 and 9'. The preferred heat exchange medium would be water, which would change at least partially from liquid to gas phase when passing through the tubes. The tube bundle in the heat exchanger will preferably be of the "bayonet" type wherein one end of the bundle is unattached, thereby minimizing problems due to the expansion and contraction of the heat exchanger components when exposed to and cooled from the very high regenerated catalyst temperatures. The heat transfer that occurs is, from the catalyst, through the tube walls and into the heat transfer medium. Fluidizing gas, preferably air, is passed into a lower portion of the shell side of heat exchanger 3 via line 7', thereby maintaining a dense phase fluidized catalyst bed in the shell side. Control valve 20 is placed in line 7'. An associated control system will comprise means 21 to sense the temperature in a portion of combustion chamber 2, such as the upper portion shown, temperature control means 22 having an adjustable set point connecting with temperature sensing means 21 and developing an output signal, and means 23 for transmitting the output signal to control valve 20, whereby the latter may be adjusted responsive to the temperature at the upper portion of combustion zone 1. The flow of fluidizing gas to the shell side of heat exchanger 3 will thereby be regulated which in turn regulates the mass velocity of the fluidized bed over the outside surfaces of the tubes by affecting the extent of turbulence of the bed, which in turn regulates the heat transfer coefficient across such surfaces, and thus the quantity of heat transfer. There may be a catalyst flow control system, which is not shown, regulating catalyst flow from heat exchanger 3, such as means to control the amount of catalyst in the heat exchanger by controlling the flow of catalyst through a catalyst slide valve in conduit 5 responsive to the pressure differential across the catalyst heat in the heat exchanger. This system would comprise means to sense the differential pressure from the bottom to the top of the shell side of the heat exchanger, pressure control means having an adjustable set point connecting with the pressure differential sensing means and developing an output signal, and means for transmitting the output signal to the control valve whereby the latter is adjusted responsive to the pressure, thereby regulating the flow of catalyst from the heat exchanger and maintaining a desired dense phase fluid catalyst bed depth in the shell side of the heat exchanger sufficient to substantially submerge the tubes in the dense phase catalyst bed. The rate of catalyst flow, once established after unit start-up would be expected to remain substantially constant.

Still referring to FIG. 1, the catalyst will flow from the bottom portion of heat exchanger 3, through heat exchanger catalyst discharge conduit 5, and into the lower portion of combustion chamber 1 via mixing conduit 11. The latter conduit, shown in vertical orientation, will also be the recipient of the spent catalyst from the reactor via conduit 8. The regeneration gas is also introduced into mixing conduit 11 via line 7 and serves to carry the catalyst mixture into combustion chamber 1. The catalyst-regeneration gas mixture passes into the lower locus of the combustion zone via distributor 13. Hot regenerated catalyst is returned to the FCC reactor via conduit 33.

Figure 2:
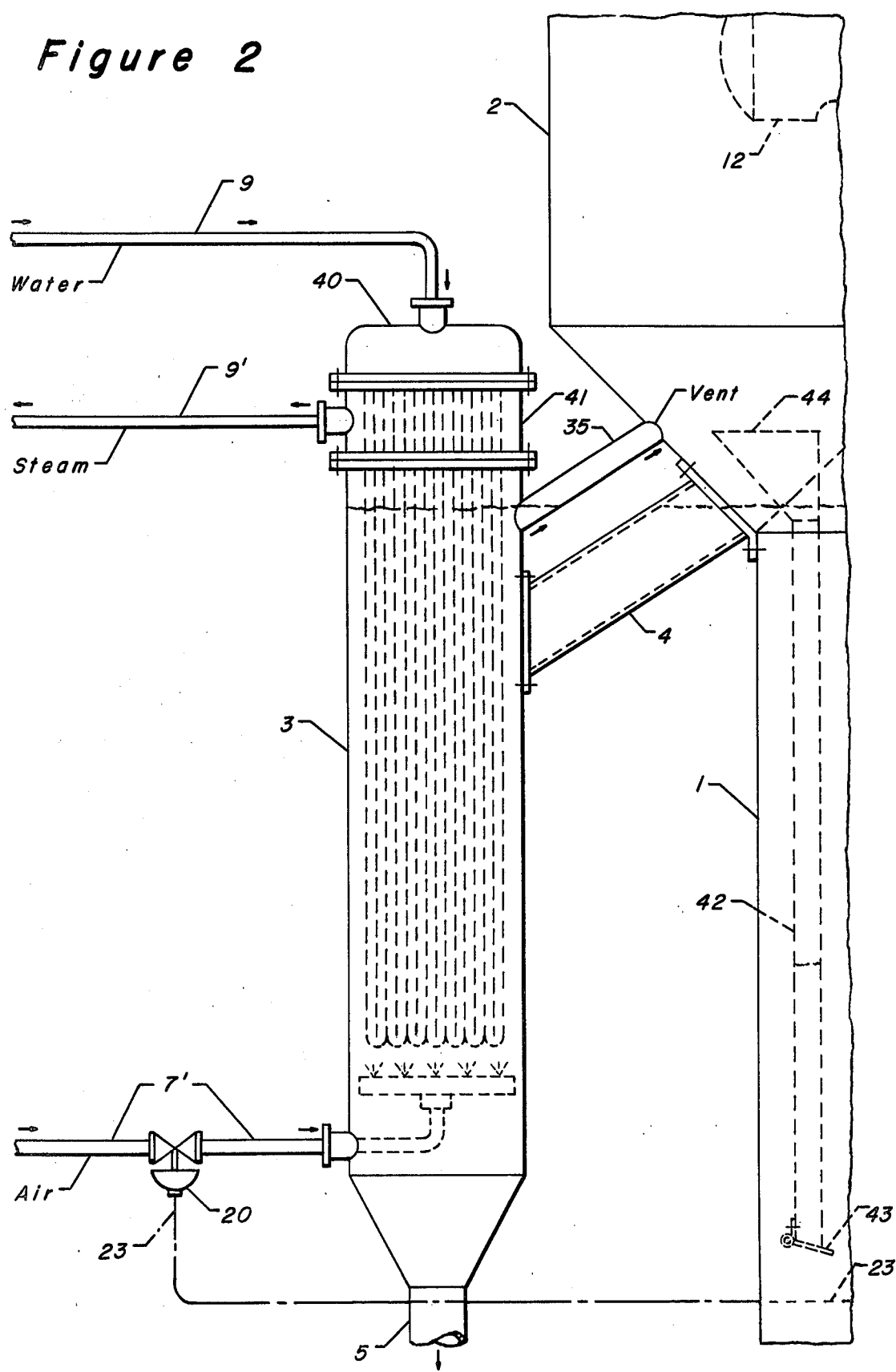
FIG. 2 is an enlarged sectional view of heat exchanger 3 and various details showing the interconnection of heat exchanger 3 with disengagement zone 2.

Referring now to FIG. 2, details are shown of a preferred embodiment of heat exchanger 3 and the manner of the interconnection of heat exchanger 3 with disengagement zone 2. Heat exchanger 3 is shown with the shell side filled with a dense phase fluidized catalyst bed to a level slightly higher than the catalyst inlet into heat exchanger 3. Catalyst spills into the inlet of conduit 4 from the catalyst collection section at the bottom of collection chamber 2 and flows through conduit 4 into heat exchanger 3. A vent 35 is shown from heat exchanger 3 to disengagement chamber 2 above hot catalyst conduit 4 which serves to allow fluidizing gas to escape from the shell of heat exchanger 3 into the disengagement zone. The tube bundle shown is of the bayonet type in which the tubes are attached at the top or "head" of the heat exchanger, but not at any other location. A typical configuration of tubes in the bayonet type bundle would be one inch tubes each descending from inlet manifold 40 in the head down into the shell through a three inch tube sealed at its bottom, each one inch tube emptying into the three inch tubes in which it is contained just above the sealed end of the three inch tube. A liquid, such as water, would be passed down into the one inch tubes, would empty into the three inch tubes, would absorb heat from the hot catalyst through the wall of the three inch tubes as it passed upward through the annular space of the three inch tubes and would exit the heat exchanger, at least partially vaporized, from outlet manifold 41 in the head.

Also shown in FIG. 2 is optional dipleg or standpipe 42 with bottom flapper valve 43 and upper weir 44. The purpose of this dipleg is to maintain the catalyst level in the disengagement chamber, particularly when the heat exchanger is taken off stream, such as for cleaning or other maintenance and to provide an automatic means for a bypass around heat exchanger 3 as necessary. The lip of weir 44 is slightly higher (about 6 inches) than the catalyst level maintained in the catalyst collection section while the heat exchanger is in service at which time only a small amount of catalyst will flow into the dipleg. When the catalyst flow through heat exchanger 3 is diminished or stopped the level in the collection section will overflow weir 44 and begin to fill dipleg 42. When the force exerted by the head of catalyst filling dipleg 42 on flapper valve 43 exceeds that pressure required to open valve 43, i.e. overcome the force exerted by the spring or counterweight holding the valve closed, catalyst will empty from the dipleg into combustion chamber 1. The flapper valve and/or head of catalyst in the dipleg also serve to prevent undesired reversal of flow up the dipleg.

The above scheme provides the ability to remove heat from the FCC regenerator as required to maintain a maximum combustion zone temperature and at the same time maintain a high degree of stable steady state operation conducive to the controlability and efficiency of the regenerator, all while enjoying the flexibility and ease of operation of an external catalyst cooler or heat exchanger (particularly the ability to not have to utilize cooling during start-up) and the efficiency of catalyst-flue gas separation achieved by a disengagement zone unencumbered by a dense catalyst phase and heat removing paraphernalia.

ILLUSTRATIVE EMBODIMENT

The following Illustrative Embodiment represents a particularly preferred mode contemplated for the practice of the invention, expressed in terms of the mass flow rates and temperatures of streams flowing in the regenerator depicted in the attached figures. The regenerator processes spent catalyst from a reaction zone which is cracking a reduced crude oil feedstock. In the tabulation below the streams flowing within conduits are tabulated in registry with the item numbers of the conduits shown in the figures.

| Stream | | lbs./hr. | °F. |
|---|---|---|---|
| 8 | Coke Contaminated Catalyst (from reactor) | 2,724,552 | 1050 |
| | Catalyst | 2,691,362 | 1050 |
| | Coke | 30,902 | 1050 |
| 7 + 7' | Regeneration Gas (air) | 463,530 | 307 |
| 33 | Hot Regenerated Catalyst from Upper Locus of Combustion Zone (to reactor) | 2,691,362 | 1380 |
| 10 | Hot Regenerated Catalyst plus Hot Flue Gas | 4,114,730 | 1400 |
| | Hot Catalyst | 3,621,428 | 1400 |
| | Hot Gas | 493,302 | 1400 |
| 5 | Recycled Cool Regenerated Catalyst (to mixing conduit 11) | 3,621,428 | 1230 |
| 18 | Flue Gas | 493,302 | 1400 |
| 3 | Heat Removed by Heat Removal Means - 148.67 × 10⁶ BTU/hr. | | |
| | Heat Losses from Regenerator Vessel - 3.41 × 10⁶ BTU/hr. | | |

It should be noted that in this particular operation the feedstock to the reaction zone is reduced crude oil, a material which yields a relatively high coke production. Such a high coke production, and the consequent, extraordinarily high evolution of heat in the combustion zone made necessary the recycle of 3,621,428 lbs./hr. of cooler regenerated catalyst from the heat removal zone to the combustion zone in order to limit the maximum combustion zone temperature to 1400° F.

What is claimed is:

1. A process for regenerating a coke contaminated fluid catalyst, said process including the steps of:

(a) introducing oxygen containing regeneration gas, coke contaminated fluid catalyst, and cool recycled regenerated catalyst from a source hereinafter described, into a lower locus of a dilute phase combustion zone maintained at a temperature sufficient for coke oxidation and therein oxidizing coke to product hot regenerated catalyst and hot flue gas;

(b) transporting said hot flue gas and said hot regenerated catalyst from an upper locus of said combustion zone into a regenerated catalyst disengaging zone, wherein said hot regenerated catalyst is separated from said flue gas;

(c) transporting a portion of said hot regenerated catalyst from said disengaging zone to the upper locus of a cooling zone separate from said disengaging zone wherein said cooling zone said hot regenerated catalyst is passed downwardly and heat is withdrawn from said hot regenerated catalyst by indirect heat exchange with a cooling fluid enclosed in a heat exchange means inserted into said cooling zone to produce cool regenerated catalyst, said catalyst being maintained in said cooling zone as a dense phase fluidized bed by passing a fluidizing gas upwardly through such bed, the quantity of heat withdrawal from said catalyst in said cooling zone being controllably maintained by controlling the quantity of said fluidizing gas into said cooling zone, whereby the heat transfer coefficient between said heat exchange means and said fluidized bed and thus the quantity of heat transferred is controlled; and (d) withdrawing said cool regenerated catalyst from a lower locus of said cooling zone and transporting said catalyst to said lower locus of said combustion zone as said cool recycled regenerated catalyst.

2. The process of claim 1 wherein the temperature at a selected locus of said combustion zone is controllably maintained by controlling the quantity of said fluidizing gas to said cooling zone, and thereby the quantity of heat withdrawal from said catalyst in said cooling zone, in response to said temperature at said selected locus.

3. The process of claim 2 wherein said selected locus is an upper locus of said combustion chamber.

4. The process of claim 1 wherein said fluidizing gas comprises regeneration gas.

5. The process of claim 1 wherein said cooling fluid comprises water.

6. The process of claim 5 wherein said water cooling fluid changes from liquid to gas phase while absorbing heat in said heat exchange means.

7. The process of claim 1 wherein said regeneration gas, coke contaminated fluid catalyst and cool recycled regenerated catalyst are mixed together in a mixing zone and the resulting mixture is passed from said mixing zone to said combustion zone.

* * * * *

UNITED STATES PATENT AND TRADEMARK OFFICE
CERTIFICATE OF CORRECTION

PATENT NO. : 4,353,812
DATED : October 12, 1982
INVENTOR(S) : David A. Lomas et al It is certified that error appears in the above-identified patent and that said Letters Patent are hereby corrected as shown below:

Title Page, lefthand column, the filing date should read "June 15, 1981".

Signed and Sealed this

Seventh Day of December 1982

[SEAL]

Attest:

GERALD J. MOSSINGHOFF

Attesting Officer

Commissioner of Patents and Trademarks